A. Searls.
Thill Coupling.
No. 77,769.   Patented May 12, 1868.

Witnesses.
John H. Gifford

Inventor.
Anson Searls

United States Patent Office.

ANSON SEARLS, OF NEW YORK, N. Y.

Letters Patent No. 77,769, dated May 12, 1868.

---

IMPROVEMENT IN SHAFT-COUPLING FOR CARRIAGES.

---

The Schedule referred to in these Letters Patent and making part of the same.

---

TO ALL PERSONS TO WHOM THESE PRESENTS SHALL COME:

Be it known that I, ANSON SEARLS, of the city of New York, have invented a new and useful improvement in shaft-couplings for carriages, which I call an "Improved Shaft-Coupling;" and I do hereby declare the following, taken together with the accompanying drawings, to be a full, clear, and exact description of the same.

My invention consists in making a shaft or pole-coupling in the form of a hook, and closing the hook with the elongated head of the T-headed bolt I, curved to fit the aperture of the hook; and also the arrangement of a rubber or other spring in a recess in the hook under the nut of the bolt, to maintain a constant pressure on the parts, to prevent rattling and wear, and prevent the nut from unscrewing.

This hook is to attach to the bolt or pin of a common shaft-clip, and is designed to become readily detached when desired, and perfectly safe from accident, and free from vibration and rattle.

To better describe its parts, reference is made to—

Figure 1, which is a sectional view of the hook A, nut E, rubber K, washer J, T-headed bolt I, and the pin of the clip B.

Figure 7:
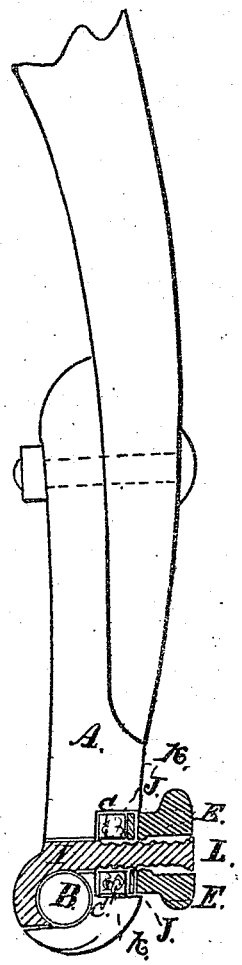
Figure 3:
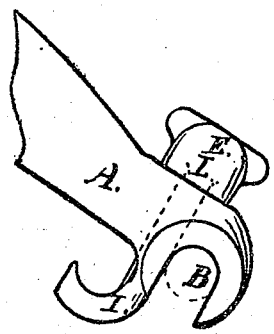
Figure 3 is a view of the hook A, nut E, and the bolt I, turned half around, opening the aperture of the hook, showing the curved form of the bolt I, reversed from fig. 1.
Figure 2:
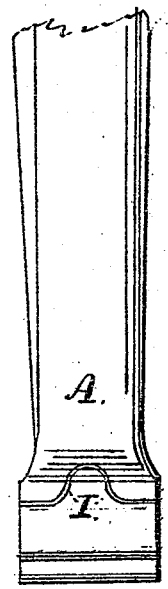
Figure 2 is a front view of the hook A, showing the elongated end of the T-head bolt I in the aperture of the hook.

The bolt I, in fig. 1, clasps the pin B. By screwing down the nut E on to the rubber or equivalent spring K, a constant pressure is maintained on the parts, preventing vibration. By turning the nut E backwards until the riveted end of the bolt at L engages with the thread of the nut, the head of the bolt is pushed out of the aperture of the hook, and turned as in fig. 3, admitting the detaching of the hook. The hook is provided with a recess, C, for the reception of the rubber K, and over the rubber is a washer, J, to protect it.

Having thus described my invention, I claim—

1. The shaft-hook A, with a recess, C, in the back part of it, and hole for bolt I, as set forth.
2. The curved T-head bolt I, for the purposes described.
3. The combination of the bolt I, spring K, washer J, and nut E, in combination with the hook A and pin B, substantially as described, and all for the purposes set forth.

Signed this, the twentieth day of November, 1867.

ANSON SEARLS.

Witnesses:
    JOHN A. GIFFORD,
    GEO. H. ROSE.